(12) United States Patent
Alm et al.

(10) Patent No.: US 11,967,002 B2
(45) Date of Patent: Apr. 23, 2024

(54) METHOD AND IMAGE-PROCESSING DEVICE FOR ANONYMIZING A DIGITAL COLOUR IMAGE

(71) Applicant: Axis AB, Lund (SE)

(72) Inventors: Carl-Axel Alm, Lund (SE); Håkan Ardö, Lund (SE); Raphael Teller, Lund (SE); Song Yuan, Lund (SE); Tim Borglund, Lund (SE)

(73) Assignee: AXIS AB, Lund (SE)

( * ) Notice: Subject to any disclaimer, the term of this patent is extended or adjusted under 35 U.S.C. 154(b) by 268 days.

(21) Appl. No.: 17/349,939

(22) Filed: Jun. 17, 2021

(65) Prior Publication Data

US 2021/0409573 A1    Dec. 30, 2021

(30) Foreign Application Priority Data

Jun. 29, 2020 (EP) .................................... 20182858

(51) Int. Cl.
  *G06T 11/00* (2006.01)
  *G06T 5/40* (2006.01)
  *G06T 5/50* (2006.01)

(52) U.S. Cl.
  CPC .............. *G06T 11/001* (2013.01); *G06T 5/40* (2013.01); *G06T 5/50* (2013.01)

(58) Field of Classification Search
  CPC ........... G06T 11/001; G06T 5/40; G06T 5/50; H04N 9/70
  See application file for complete search history.

(56) References Cited

U.S. PATENT DOCUMENTS

| | | | | |
|---|---|---|---|---|
| 5,625,762 A * | 4/1997 | Takizawa | ............... | G06V 10/56 382/162 |
| 5,825,892 A * | 10/1998 | Braudaway | ............. | G06T 1/005 380/54 |
| 6,519,366 B1 * | 2/2003 | Kaburagi | ................ | G06T 9/005 341/200 |
| 2007/0132759 A1 * | 6/2007 | Mallick | ..................... | G06T 5/30 345/426 |
| 2007/0133869 A1 * | 6/2007 | Bhattacharjya | ...... | H04N 1/6075 382/167 |
| 2008/0304695 A1 * | 12/2008 | Holm | ........................ | G06T 5/40 382/100 |
| 2010/0195162 A1 * | 8/2010 | Majewicz | .......... | H04N 1/40012 345/591 |
| 2016/0323587 A1 * | 11/2016 | Hung | ..................... | H04N 1/642 |
| 2017/0365042 A1 * | 12/2017 | Takasumi | ................ | G06T 5/007 |

(Continued)

OTHER PUBLICATIONS

A pseudo-random numbers generator based on a novel 3D chaotic map with an application to color image encryption , Mohamed Lamine Sahari • Ibtissem Boukemara, Nonlinear Dyn (2018) 94:723-744 (Year: 2018).*

(Continued)

*Primary Examiner* — Gandhi Thirugnanam
(74) *Attorney, Agent, or Firm* — XSENSUS LLP

(57) ABSTRACT

A method for anonymizing a digital colour image comprising obtaining the digital colour image, and applying a linear random function to a respective colour vector representing colour components of a respective pixel of the digital colour image to obtain a monochrome image. The linear random function varies over the pixels of the digital colour image, and is further dependent on at least one random parameter.

18 Claims, 12 Drawing Sheets

(56) References Cited

U.S. PATENT DOCUMENTS

2021/0409573 A1* 12/2021 Alm ........................ G06T 5/50
2023/0059499 A1* 2/2023 Toizumi ................... G06T 5/00

OTHER PUBLICATIONS

Person De-Identification in Videos Prachi Agrawal and P. J. Narayanan, IEEE Transactions on Circuits and Systems for Video Technology, vol. 21, No. 3, Mar. 2011 (Year: 2011).*
Prinosil, "Clothing Color Based De-Identification", 41st International Conference on Telecommunications and Signal Processing (TSP), IEEE, XP033389862, Jul. 4, 2018, pp. 388-391.
Agrawal et al., "Person De-Identification in Videos", Computer Vision—ACCV, XP019141215, 2009, pp. 266-276.

* cited by examiner

METHOD AND IMAGE-PROCESSING DEVICE FOR ANONYMIZING A DIGITAL COLOUR IMAGE

CROSS-REFERENCE TO RELATED APPLICATION

This application is a continuation of and claims priority to European Patent Application No. 20182858.9, filed on Jun. 29, 2020, the disclosure of which is incorporated herein by reference in its entirety.

TECHNICAL FIELD

The embodiments herein relate to image processing. In particular, a method and image-processing device for anonymizing a digital colour image are disclosed. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed. However, it is illegal to mount cameras in many places without having a license/permission. Sometimes it can be costly and time consuming to get the license. By distorting a video image in such a way that it will be impossible to identify persons it should be possible to mount cameras in many more places, e.g. for surveilling schools.

However, the requirement to not be able to identify persons may be in contrast to the requirement of being able to determine what is happening in the video.

For example, it may be of interest to perform people counting or queue monitoring on anonymous image data. In practice, there is a trade-off between meeting these two requirements: non-identifiable video, and extracting large amounts of data for different purposes such as people counting.

Several image-processing techniques have been described to avoid identifying persons while still being able to recognize activities. For example, edge detection/representation, edge enhancement, silhouetting objects, and different sorts of "colour blurring", such as colour variation or dilation are such examples of manipulations.

Image processing refers to any processing that is applied to an image. The processing can include application of various effects, masks, filters or the like, to the image. In this manner, the image can e.g. be sharpened, converted to grey scale, or altered in some way. The image has typically been captured by a video camera, a still image camera or the like.

SUMMARY

An object may thus be how to de-identify or anonymize persons in a digital image, e.g. a video image, while still being able to determine what is happening in the digital image, specifically in the video image. A further object may be to irreversibly anonymize persons in the digital image, while still being able to determine what is happening in the digital image.

According to an aspect, the object is achieved by a method for anonymizing a digital colour image comprising obtaining the digital colour image, and applying a linear random function to a respective colour vector representing colour components of a respective pixel of the digital colour image to obtain a monochrome image. The linear random function varies over the pixels of the digital colour image, and is further dependent on at least one random parameter.

According to another aspect, the object is achieved by an image processing device configured to perform the above method.

According to further aspects, the object is achieved by a computer program and a computer program carrier corresponding to the aspects above.

By applying the linear random function, which varies over the pixels of the digital colour image, to the respective colour vector, persons in the digital colour image are anonymized while it is still possible to determine what is happening in the digital colour image.

A further advantage of embodiments herein is that it is difficult to reverse the operations of the anonymization, such as the linear random function, to be able to identify the persons in the image after the anonymization has taken place. Thus, it may be possible to irreversibly anonymize persons in the digital image, while still being able to determine what is happening in the digital image. This increases the security of the method, and thus increases the possibility of obtaining a license/permission to use video surveillance in a certain place.

BRIEF DESCRIPTION OF THE DRAWINGS

In the Figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

As mentioned above it may be of interest to perform people counting or queue monitoring on anonymous image data. Therefore, an object of embodiments herein may be to anonymize persons in a digital image, while still being able to determine what is happening in the digital image.

Figure 1:
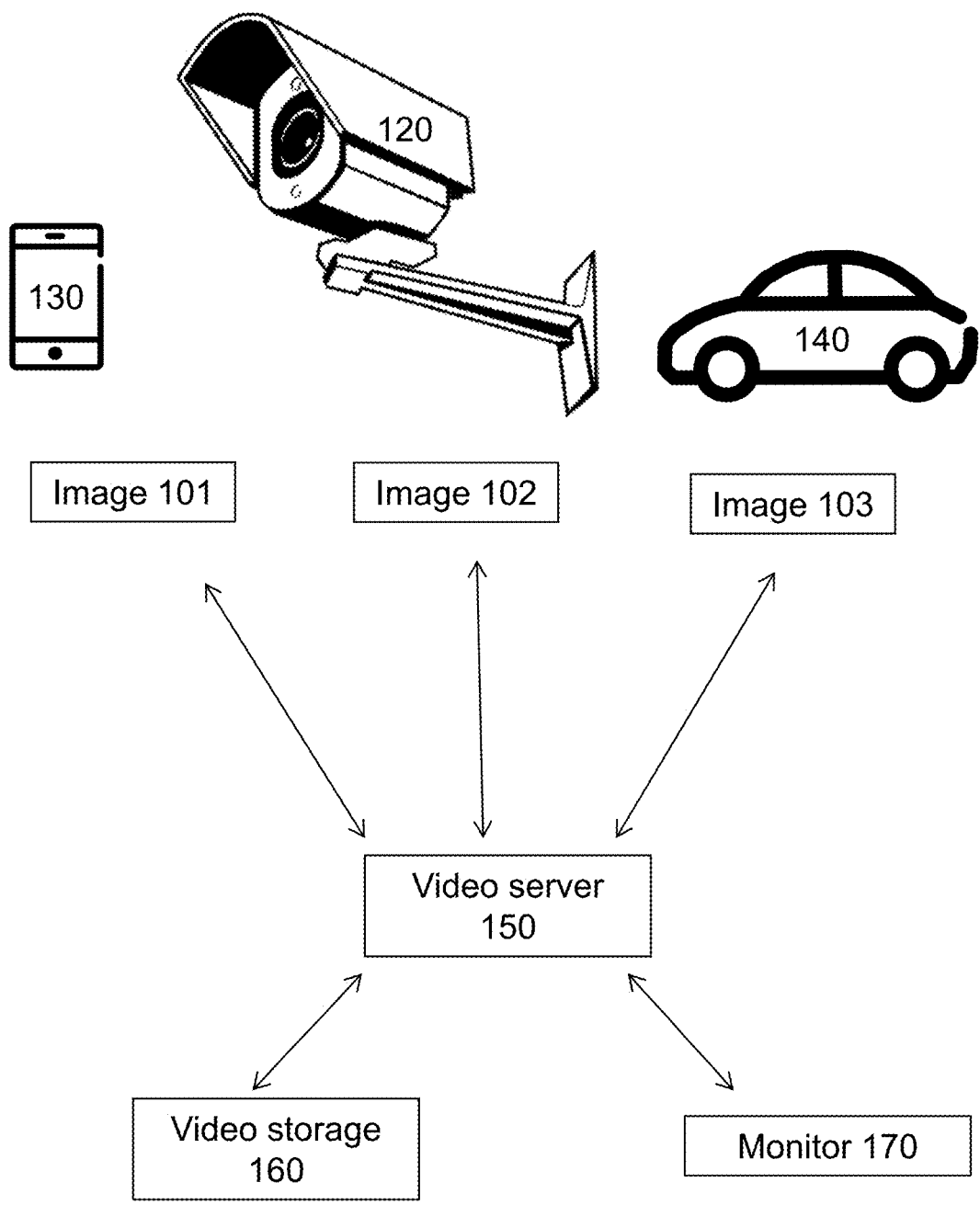
FIG. 1 is a schematic overview illustrating exemplifying embodiments herein.

Embodiments herein may be implemented in one or more image processing devices. FIG. 1 depicts various exemplifying image processing devices, which can perform image processing on a digital image 101, 102, 103, such as a digital video image. The image processing device may be an image capturing device, such as a video recorder, a surveillance camera 120, a digital camera, a smartphone 130 including an image sensor, or a car 140 including an image sensor. The image processing device, e.g. a wired or wireless device, may also obtain the image, for example from the image capturing device over a network or the like. This may for example be the case for a video server 150 in FIG. 1.

A video server is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. In FIG. 1, a video server 150 is connected, e.g. over a network, to the image processing devices: the surveillance camera 120, the smartphone 130 and the car 140. The video server 150 may further be connected to a video storage 160 for storage of video images, and/or connected to a monitor 170 for display of video images.

Thus, the image processing device is capable of processing the digital image. The image may have been captured by the image processing device itself or it may have been received from another device, which captured the image, or from a memory, such as hard drive or the like.

In order to better appreciate the following detailed description, some terms will be explained.

When the image has been captured, data representing the image can be stored in any known existing or future format. Typically, each pixel of the captured image is represented by one or more values representing the intensity of the captured light within a certain wavelength band. These values are usually referred to as colour components, or colour channels.

For example colours of the image can be represented by colour components in a colour space, such as Red, Green and Blue in an RGB colour space or Cyan, Magenta, Yellow, and Key in a CMYK colour space, or the like.

A colour component may thus refer to one of the components of RGB, one of CMYK or the like. Further known formats include, but are not limited to, Hue Saturation Luminance (HSL) Colour Format, Luminance and Chrominance (YUV) Colour Format etc.

Embodiments herein will now be described using the RGB colour space for exemplary purposes. It is to be understood that the embodiments also apply to other colour spaces.

A common implementation of the RGB colour model is the 24-bit implementation, with 8 bits, or 256 discrete levels of colour per channel. Any colour space based on such a 24-bit RGB model is thus limited to a range of 256×256× 256=16.7 million colours.

Moreover, as used herein, the term "image" may refer to an image frame including information originating from an image sensor that has captured the image.

Figure 2A:
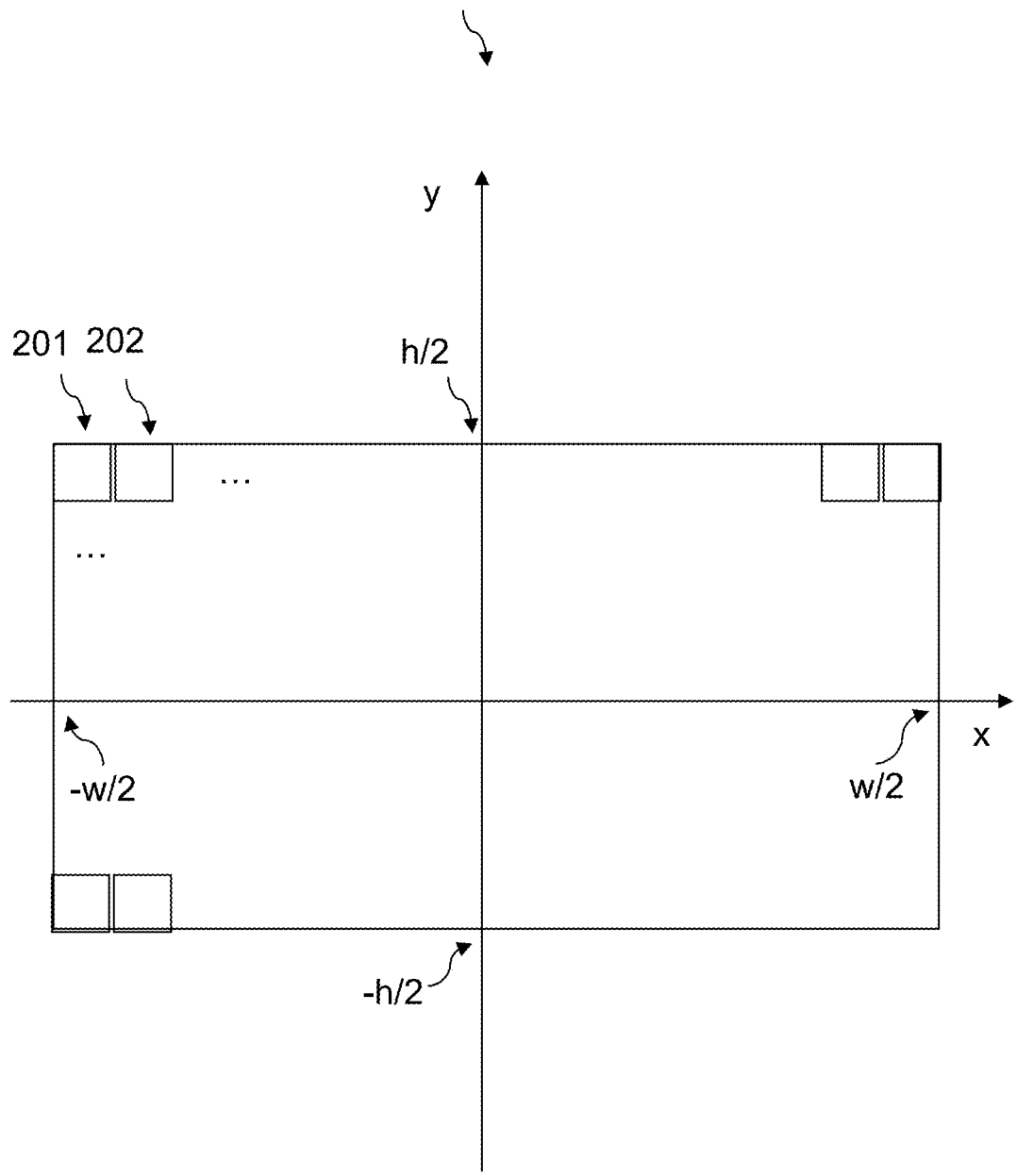
FIG. 2a illustrates a digital image.

FIG. 2a illustrates an exemplifying digital colour image 200 in a two-dimensional space, which may also be referred to as colour image 200, or even image 200 in the following.

The pixels of the colour image 200 consisting of w×h pixels may be referred to using their coordinates x and y, with $$\frac{-w}{2} \leq x < \frac{w}{2} \wedge -h/2 \leq y < h/2.$$

coordinate x, y may also be referred to as a pixel position. For example, a pixel 201 may be referred to with the coordinates (x=−w/2, y=h/2). A second pixel 202 is also illustrated along with several other pixels.

Figure 2B:
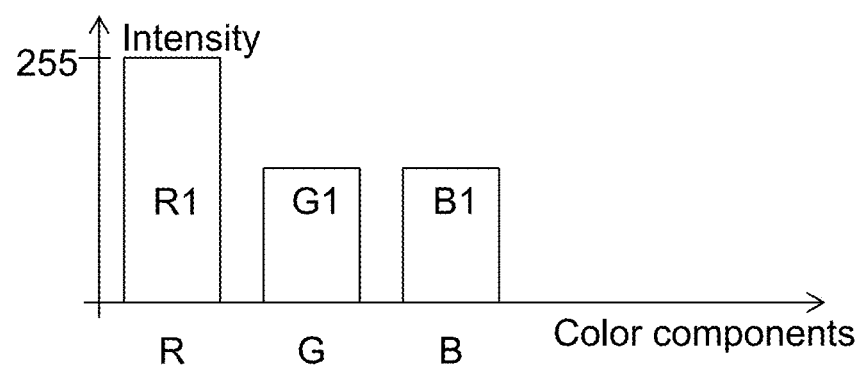
FIG. 2b illustrates a representation of colour in pixels from a portion of a digital colour image.

FIG. 2b illustrates colour content or colour components of pixel 201, e.g. within a range 0-255. For example, a red colour component R1 may have the value 255, a green colour component G1 may have the value 143 and a blue colour component B1 may also have the value 143. Likewise, the second pixel 202 may also be represented by colour components within the same range 0-255. For example, a second red colour component may have the value 150, a second green colour component may have the value 150 and a second blue colour component may also have the value 150.

Figure 3:
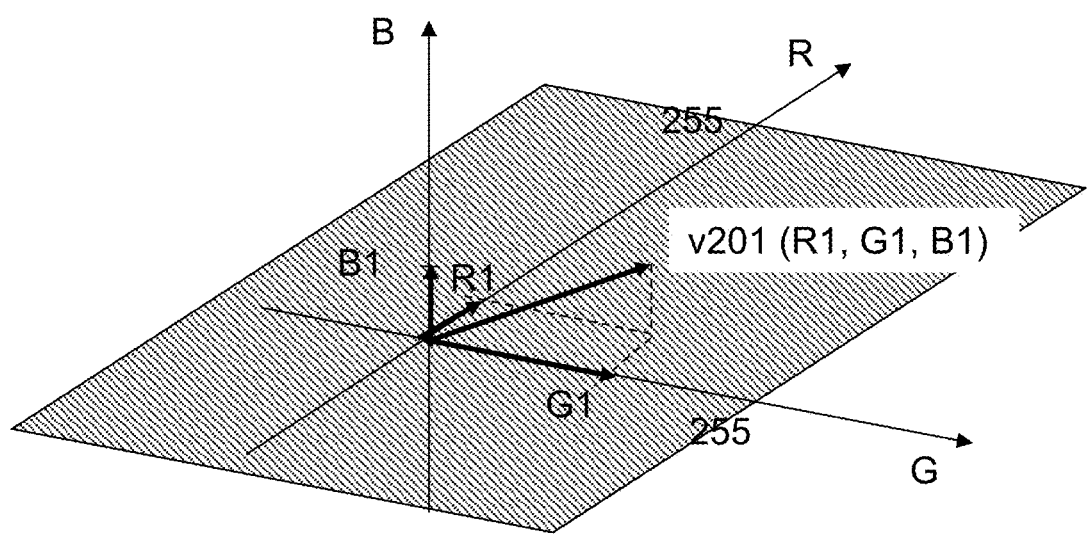
FIG. 3 illustrates a colour vector in RGB colour space.

FIG. 3 illustrates a colour vector v201 in a three-dimensional colour space represented by three colour space axes R, G and B. An RG-plane is also illustrated with stripes. The three colour components R1, G1 and B1 are also illustrated and dotted lines have been added to help visualize the decomposition of the colour vector v201 into its colour components.

Figure 4:
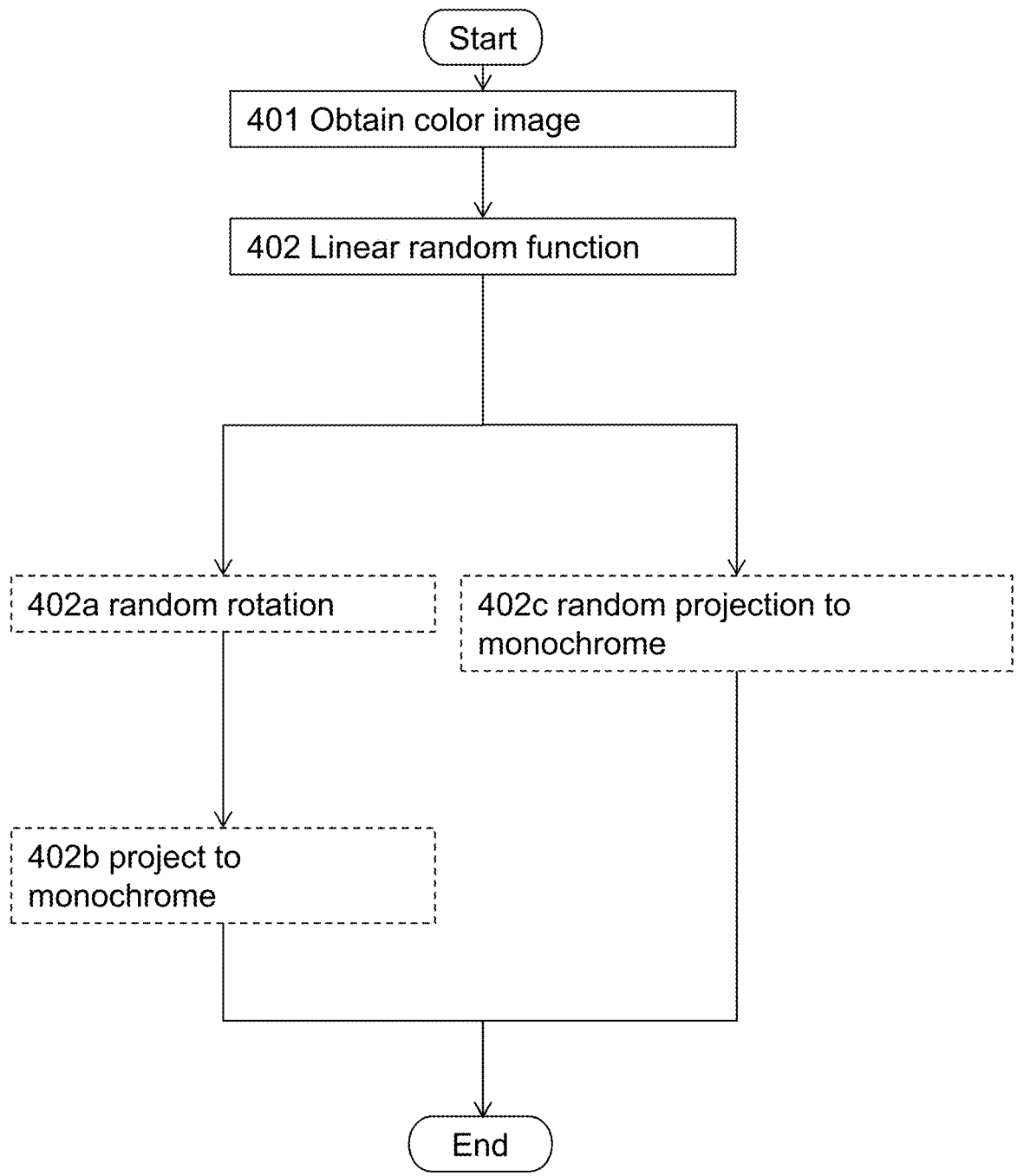
FIG. 4 is a flowchart illustrating embodiments of a method in an image processing device.
Figure 5A:
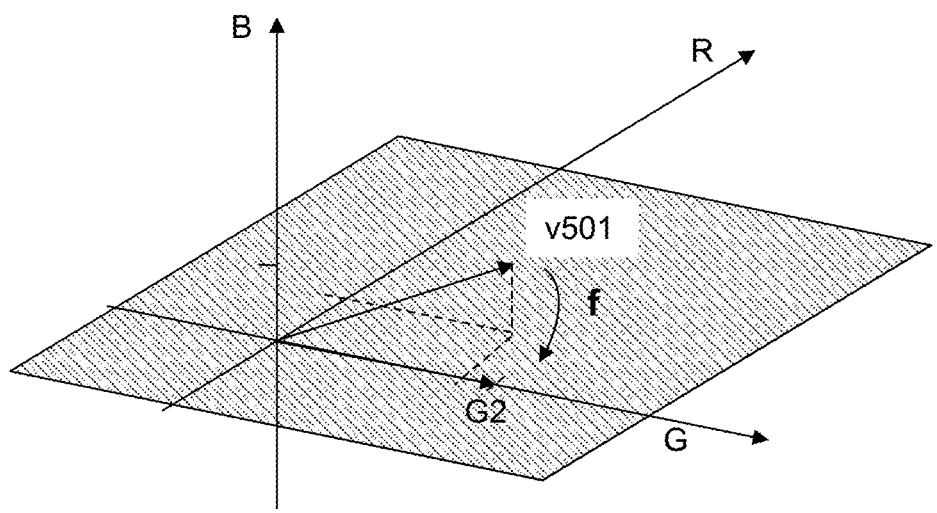
FIG. 5a illustrates further embodiments of a method in an image processing device.

Exemplifying methods according to embodiments herein will now be described with reference to 1) a flowchart of FIG. 4, and 2) colour vectors of FIGS. 5a and 5b, and 3) colour component intensity values of FIG. 6 and FIGS. 7a, 7b and 7c. There will also be further references to the digital colour image 200 of FIGS. 2a and 2b already presented. The methods are implemented in the image processing device, e.g. in any of the image processing devices 120-150 of FIG. 1. The image processing device thus generally performs a method for anonymizing a digital colour image, such as the digital colour image 200. Anonymizing the digital colour image 200 may for example mean to make it more difficult to identify humans and/or other beings and/or objects present in the digital colour image 200.

One or more of the following actions may be performed in the following exemplifying order. In other examples, the order may differ from what is described below.

Action 401

The image processing device obtains the digital colour image 200.

In some embodiments, the image processing device obtains the digital colour image 200 by receiving the digital colour image 200 from an image capturing device or by receiving the digital colour image 200 from a memory, such as an internal memory, an external memory, a hard drive or the like. In some examples, this means that the image processing device may be included in a computer system, such as a cloud server or the like.

As mentioned above, the colour of a respective pixel of the digital colour image 200, such as pixel 201, may be represented with a respective colour vector comprising colour intensity values for the different colour components of the colour space, such as the RGB colour space. For example, the colour vector v201 of pixel 201 may be written as [R1, G1, B1], where R1, G1 and B1 each can take on intensity values between 0 and 255. In the following actions, reference is made to the colour vector v201 of pixel 201, but it is to be understood that the actions are equally applicable to any pixel and that pixel's colour vector.

Action 402

The image processing device applies a linear random function f to a respective colour vector V201, V501 representing colour components R, G, B of a respective pixel of the digital colour image 200 to obtain a monochrome image. In linear algebra, a linear function is a map between two vector spaces that preserves vector addition and scalar multiplication. However, for embodiments herein applicable to a three-dimensional real valued colour space, the linear function may comprise a matrix multiplication of the colour vector V201, V501 with a 3×3 matrix. Thus, for a respective pixel, the linear random function operates on the colour vector v201 and linearly transforms it into a one-dimensional colour component. FIG. 5a illustrates such a linear transform of the colour vector v501, v201 onto the G-component axis. This produces a monochrome image since the same colour component is used for all pixels. For example, the colour vector v201 may comprise the values [255, 143, 143] which may be transformed into [0, 210, 0], which means that the resulting one-dimensional colour component G502 is a G-component with value 210.

Below, in the following actions 402a, 402b and 402c, two different ways of linearly transforming the colour vector v201 into the one-dimensional colour component will be presented in more detail. For example, in some embodiments the linear random function f is a rotation function that linearly rotates the colour vector v201 in action 402a. Action 402a is then followed by a projection, of a thus formed rotated colour vector, onto the one-dimensional colour component in action 402b. In some other embodiments, the linear random function is a random projection function that projects the colour vector v201 onto the one-dimensional colour component in action 402c.

The linear function is random since it is dependent on at least one random parameter, coefficient and/or variable. Thus, another way of defining the function f is that it is a linear function of at least one random parameter, coefficient and/or variable. In some embodiments the value of the at least one random parameter, coefficient and/or variable will be the same for all the pixels, i.e. the at least one random parameter may be invariant over the pixels 201, 202, while for other embodiments the at least one random parameter will take on different values for the respective pixel, e.g. the random parameters associated with pixel 201 may be different from the random parameters associated with the second pixel 202. In some other embodiments the at least one random parameter do vary over the pixels, but may be the same for some of the pixels, e.g. it may be the same for neighbouring pixels, it may further be different for every second pixel, or every fifth or tenth pixel. An advantage of using different random values for different pixels, such as pixels 201 and 202, is that it is more difficult to reverse the anonymization, as there are more random values that has to be figured out. Further, the linear random function varies over the pixels 201, 202 of the digital colour image 200. Thus, the linear random function f is also dependent on the pixel position x, y within the digital colour image 200. An example of such a random function will be presented further below.

In this manner, persons in the digital colour image 200 are anonymized while it is still possible to determine what is happening in the digital colour image 200. For example, the method allows for performing people counting or queue monitoring on anonymous image data.

A further advantage of embodiments herein is that after the anonymization has taken place by applying the linear random function it is difficult to reconstruct the original image and thereby identify the persons in the image. The difficulty in reversing the transformation of the image resides both in the drawing of the random numbers that the linear function depends on, and on a discard of data. In the original colour image, colour data is represented by three values, while in the transformed image colour data is represented by one value, hence data is discarded during the transformation. This increases the security of the method, and thus increases the possibility of obtaining a license/permission to use video surveillance in a certain place.

However, there is a trade-off between how anonymous the transformed image is and how useful the transformed image is for analysing what is going on in the image. A linear random function that varies little over the pixels of the colour image will make the transformed image more useful but less anonymous. On the other hand, the more the linear random function varies over the pixels of the colour image, the more anonymous the transformed image becomes, but also less useful.

In some embodiments, the linear random function f varies smoothly over pixels 201, 202 of the digital colour image 200. In other words, the linear random function f may vary slowly and/or softly over the pixels 201, 202 of the digital colour image 200. For example, the linear random function f may vary smoothly over close by or neighbouring pixels, such as pixels 201 and 202, of the digital colour image 200.

That the function is smoothly and/or slowly varying over neighbouring pixels may mean that the value of the function at one pixel 201 is close to the value of the function at the neighbouring pixel 202. In other words, the function varies less than a predetermined extent/degree/magnitude over the given pixels. For example, the values of the function at neighbouring pixels may be within a certain range, or in other words, the difference of the values of the function at neighbouring pixels may be within a threshold value, such as below a constant multiplied with a distance between the pixels. The constant may be application specific and chosen in order to make a suitable trade-off between anonymization and usability of the image for a particular image and/or for a particular application, such as people counting.

In some embodiments, neighbouring pixels comprises adjacent pixels 201, 202, while in other embodiments neighbouring pixels comprises pixels closer than a certain distance in the digital colour image 200. For example, neighbouring pixels may be pixels closer than the width of a person in the digital colour image 200.

In some embodiments, the linear random function f varies smoothly over the digital colour image 200.

A random function varying smoothly over image 200 may for example be generated by generating a polynomial with random parameters of the polynomial.

An example of such a polynomial function is the function f(x, y) below.

$$f(x,y)=c_0+c_1 x+c_2 y+c_3 x^2+c_4 y^2+c_5 xy+c_6 x^3+c_7 y^3+c_8 xy^2+c_9 x^2 y$$

f(x, y) is a third degree polynomial of the pixel position, i.e. f(x, y) is dependent on the pixel position x, y.

Further, f(x, y) above is also dependent on random parameters $c_k$, k=0 . . . 9. The values of the random parameters, $c_k$, may be generated by drawing 10 random numbers uniformly distributed between −0.5 and 0.5. In some embodiments the parameters $c_k$ are fixed for a given image frame, e.g. for the digital colour image 200, while the pixel position, x, y, is different for every pixel which will make the result of the function, f(x, y) vary over the pixels.

Another way would be to generate the random function in the frequency plane by Fourier analysis, e.g. by applying a discrete Fourier transform, such as a fast Fourier transform. That could for example be done by randomly choosing a respective amplitude of the four lowest frequencies, used to represent the function f(x, y) in the frequency domain, uniformly between −0.5 and 0.5, and setting all higher frequencies to zero. This frequency representation may be turned into a smoothly varying function over the pixel position x, y using an inverse transform, such as an inverse discrete Fourier transform.

Action 402a

In some embodiments, the linear random function comprises one or more rotation functions. The respective rotation function varies over the pixels 201, 202 of the digital colour image 200, and is dependent on at least one random parameter. Then applying the linear random function comprises rotating the colour vector v501 with the one or more rotation functions, thereby obtaining a rotated colour vector v502.

Figure 5B:
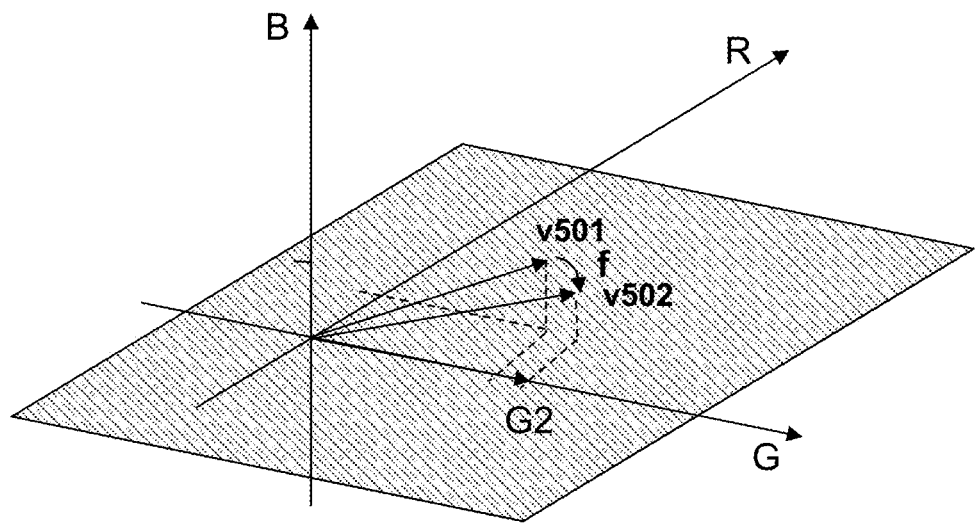
FIG. 5b illustrates further embodiments of a method in an image processing device.

FIG. 5b illustrates such a linear rotation of the colour vector v501, v201 onto the rotated colour vector v502.

In the following, the one or more rotation functions will be exemplified with three rotation functions, respectively representing a rotation about a respective one of the axes B, G and R of the colour space coordinate system using the right-hand rule.

Generally, each rotation function may be dependent on a random rotation angle. Thus, the at least one random parameter may comprise the random rotation angle. The random rotation angle may in turn be dependent on a further random parameter and/or coefficient and/or variable. Further, the rotation angles may vary over the pixels 201, 202 of the digital colour image 200. For example, the rotation angles may be given by the above polynomial function. For example, a rotation angle α, may be given or calculated by a third degree polynomial of the pixel position x, y with random parameters $C_k$.

$$\alpha(x,y)=c_0+c_1x+c_2y+c_3x^2+c_4y^2+c_5xy+c_6x^3+c_7y^3+c_8xy^2+c_9x^2y$$

β and γ may be calculated in a corresponding way. The random parameters, $c_k$, which may be generated by drawing 10 random numbers uniformly distributed between −0.5 and 0.5, may be different for each rotation angle, or they may be the same. As explained above in relation to the variability of the random parameters over the pixels, an advantage of using different random values for different angles, is that it is more difficult to reverse the anonymization, as there are more random values that has to be figured out. However, there is a trade-off with complexity.

In some embodiments, a blue rotation function $R_B$ is dependent on a blue rotation angle α, representing a rotation about the B component axis, while a green rotation function $R_G$ is dependent on a green rotation angle β, representing a rotation about the G component axis, and finally a red rotation function $R_R$ is dependent on a red rotation angle γ, representing a rotation about the R component axis.

Embodiments will now be described with three rotation matrices $R_B$, $R_G$, $R_R$, which represent the three random rotation angles α, β and γ, e.g. corresponding to yaw, pitch and roll. A three-dimensional rotation matrix R may be formed as $$R=R_B(\alpha)R_G(\beta)R_R(\gamma)$$

where $R_B$, $R_G$ and $R_R$ respectively is a basic rotation matrix (also called elemental rotation) representing a rotation about a respective one of the axes B, G and R of the colour space coordinate system using the right-hand rule as described above.

Mathematically the colour vector v501 is rotated by multiplying a corresponding column vector $v501^T$ with the rotation matrix R, i.e. $R*v501^T$.

In accordance with the above the respective rotation function is dependent on the pixel position x, y and may be generated with the above exemplified polynomial function or the like. For example, different rotation angles may be dependent on the pixel position and may be generated with the above-exemplified polynomial function or the like. The ten random numbers may be different for each rotation function.

The respective rotation function may for example correspond to a random rotation angle of the colour vector v501. The random rotation angles may for example be angles corresponding to yaw, pitch and roll.

Figure 7A:
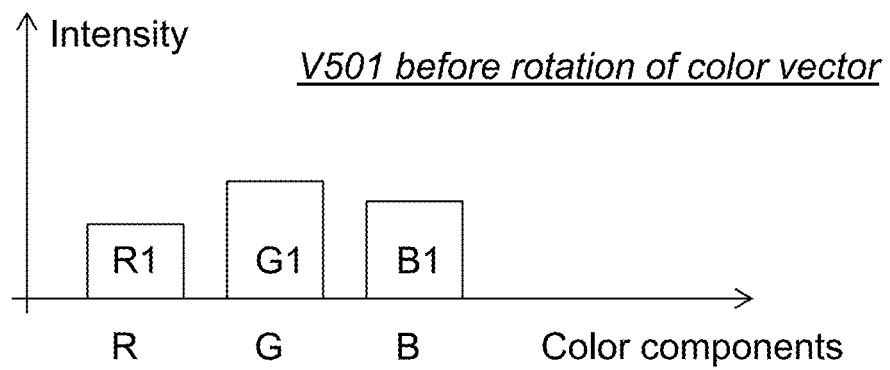
FIGS. 7a-7c illustrate further embodiments of a method in an image processing device.
Figure 7B:
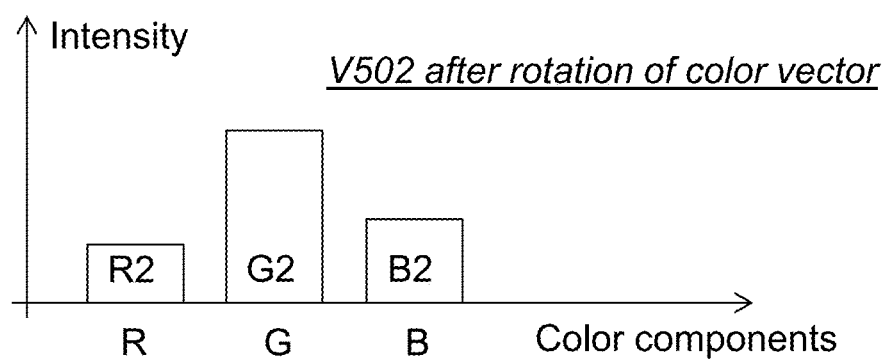
Figure 7C:
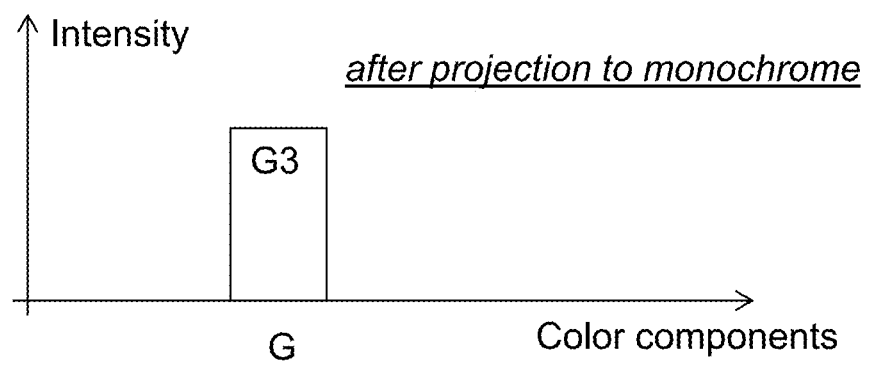

As a result of the rotation of the colour vector v501 the relative intensities of the RGB components or RGB channels changes. This is illustrated in FIGS. 7a and 7b. FIG. 7a illustrates the values of the colour components of the colour vector v501 before rotation, while FIG. 7b illustrates the values of the colour components of the rotated colour vector v502, i.e. after rotation. In this example, after rotation the values R2 and B2 of the R and B components are smaller than before the rotation, while the value G502 of the G component is larger than before rotation.

Action 402b

After rotation, the rotated colour vector v502 is projected onto a one-dimensional colour component G. For example, the rotated colour vector v502 may be projected onto one of the axes of the colour space, such as the G-component axis. This is for example illustrated in FIG. 7c, where the rotated colour vector v502 has been projected onto the G-component resulting in a value G3.

Figure 6:
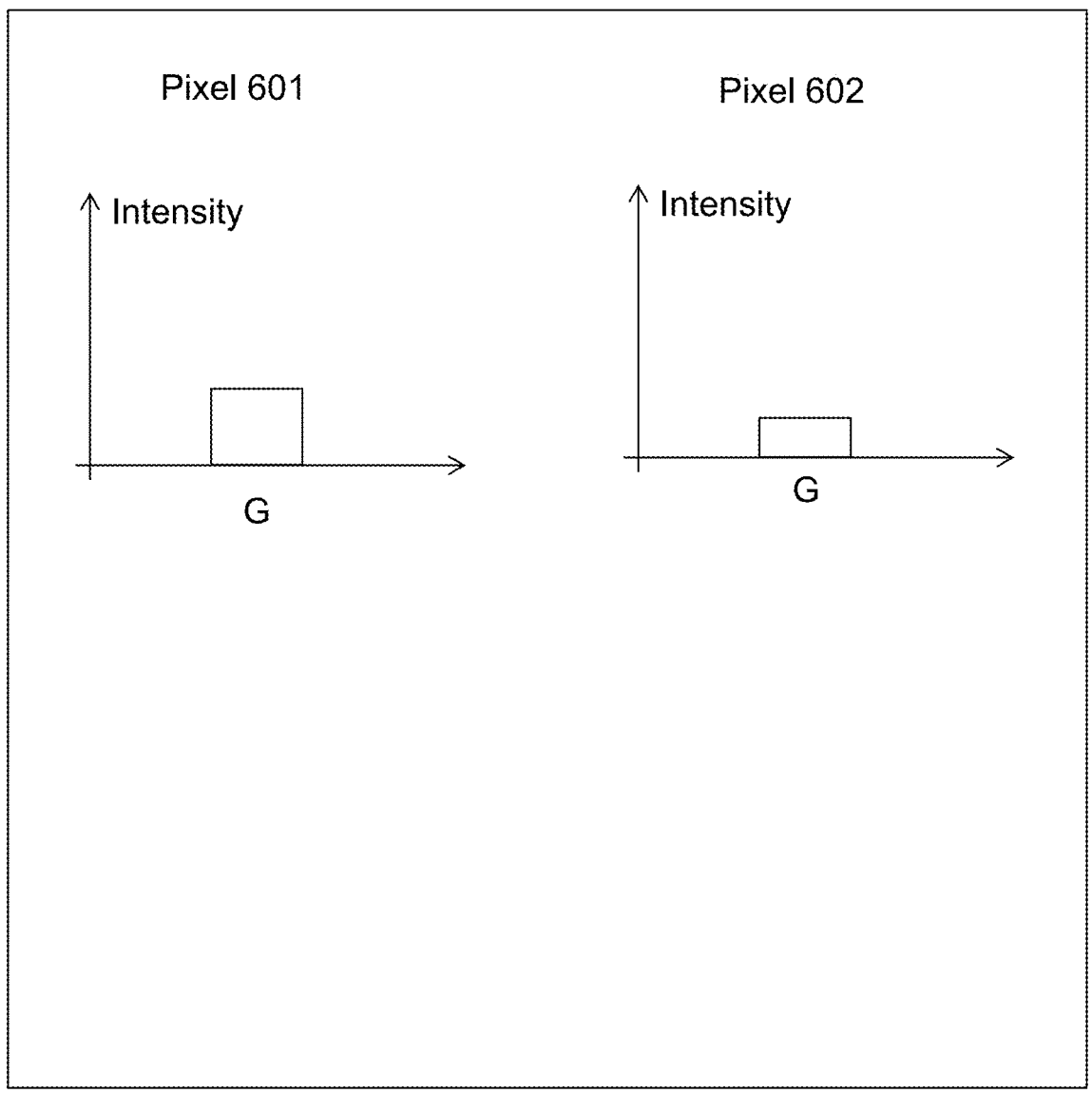
FIG. 6 illustrates a monochrome image resulting from embodiments herein.

All pixels are projected to the same one-dimensional colour component, e.g. projection onto the G-component for all pixels. This produces a monochrome image 600 illustrated in FIG. 6. FIG. 6 further illustrates the colour content of two pixels 601 and 602 of the monochrome image 600, i.e. FIG. 6 illustrates the intensity value of the G-component.

Since the projection discards some data, e.g. R- and B-components of the rotated colour vector v502, the image transformation is more secure as it is more difficult to reverse the transformation.

In some embodiments projecting the rotated colour vector v502 onto the one-dimensional colour component G comprises selecting a rotated colour component G of the rotated colour vector v502, and discarding the other colour components R, B of the rotated colour vector v502. That is, in this case the obtained monochrome image 600 comprising the one dimensional colour component G comprises the selected colour component G of the rotated colour vector v502 for the respective pixel. For these embodiments, the resulting intensity value G3 in FIG. 7c would equal the intensity value G502 of the G-component of the rotated colour vector v502. A corresponding matrix formulation would be to multiply the rotated colour vector v502 with a column vector [0, 1, 0]T. However, other projections onto the selected colour component G may also be envisioned, resulting in a projected intensity value G3 that is different from the intensity value of the selected colour component of the rotated colour vector v502. For example, the projected intensity value G3 may be calculated as a weighted sum of the individual intensity values of the rotated colour vector v502, e.g. G3=R2+ G2+B2 if (R2+G2+B2)<255, and G3=255 if G3 is above or equal to the maximum value, e.g. 255. The corresponding matrix formulation would be [p1, p2, p3]$^T$×[R2, G2, B2], where p1, p2 and p3 represent different projection weights. In another example, it is possible to combine two of the colour channels and remove one colour channel in order to find another trade-off between anonymization and keeping information. This may be advantageous for some applications, while less advantageous for other applications, since different trade-offs may be needed for different applications.

Action 402c

A random colour space-rotation followed by a fix projection could be combined into a random projection. As mentioned above in action 402a, the random rotation may be parameterized with three angles, e.g. α, β, γ representing yaw, pitch and roll. The random projection may likewise be parameterized with three weights, so there are three degrees of freedom in both cases. These parameters should in both cases vary smoothly over the image.

Thus, in some alternative embodiments, the linear random function f comprises one or more random projection weight functions, which respectively varies over the pixels 201, 202 of the digital, colour image 200, and is dependent on at least one random parameter. Then applying the linear random function f comprises projecting the colour vector v501 with the one or more random projection weight functions onto the one-dimensional colour component G.

Here the case of combining the rotation and the projection into one operation is exemplified with three such random functions: w_r representing a weight function for the red component, w_g representing a weight function for the green component, and w_b representing a weight function for the blue component. For a respective pixel x, y the colour vector v501 with elements R1, G1 and B1 are projected into a scalar value of the projected image according to:

$$w\_r(x,y)*(R1-127)+w\_g(x,y)*(G1-127)+w\_b(x,y)*(B1-127)+127$$

w_r, w_b, and w_g may also be given by a polynomial function of the pixel position x, y.

For example, w_r may be given or calculated by the above third degree polynomial of the pixel position x, y with random parameters $c_k$.

$$w\_r(x,y)=c_0+c_1x+c_2y+c_3x^2+c_4y^2+c_5xy+c_6x^3+c_7y^3+c_8xy^2+c_9x^2y$$

w_g, and w_b may be calculated in a corresponding way. The random parameters, $c_k$, which may be generated by drawing 10 random numbers uniformly distributed between −0.5 and 0.5, may be different for each weight function, or they may be the same.

Figure 8:
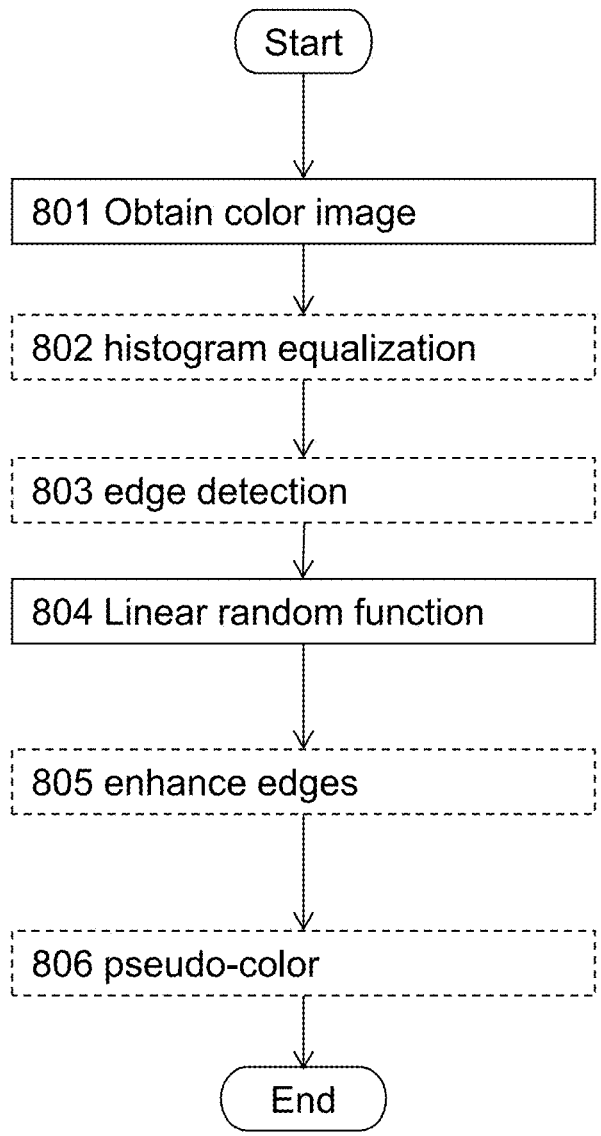
FIG. 8 is a flowchart illustrating further embodiments of a method in an image processing device.

Further exemplifying methods according to embodiments herein will now be described with reference to FIG. 8, and again with further reference to the digital colour image of FIGS. 2a and 2b and the colour space representation of FIG. 3.

Action 801

As described above in relation to action 401 of FIG. 4 the image processing device obtains the digital colour image 200.

Action 802

In addition to applying the linear random function according to action 402 above a histogram equalization of the digital colour image 200 and/or of the monochrome image 600 may also be performed. The histogram equalization may be performed before, during or after applying the linear random function. For example, when the histogram equalization is performed on the digital colour image 200 it may be performed on each colour channel, or colour component.

Since the histogram equalization is a non-linear transform it makes it more difficult for someone to figure out what the original image looked like, i.e. the security of the anonymization increases. The histogram equalization also gives higher contrast in the image, which makes it easier to see what is going on in the scene.

Action 803

In order to make it easier to see what is going on in the scene it is also possible to apply edge enhancement to the monochrome image. Edge enhancement may for example be an image processing filter that enhances the edge contrast of an image or video in an attempt to improve its acutance (apparent sharpness). Basically, it increases the contrast at the edges to make them appear sharper.

In those cases, an edge detection may be performed before the edge enhancement. The edge detection may for example take place before applying the linear random function according to action 402 above. For example, edge detection may be performed on the original colour image before applying the linear random function. It may also be performed on the colour image before applying the linear random function, but after the histogram equalization. As an alternative, edge detection may also be performed after transforming the colour image 200 to the monochrome image 600.

Action 804

As described above in relation to action 402 of FIG. 4 the image processing device applies the linear random function f to the respective colour vector v201, v501 representing the colour components R, G, B of the respective pixel of the digital colour image 200 to obtain the monochrome image 600.

Action 805

As described above in action 803 the image processing device may enhance one or more edges present in the digital colour image 200 to make it easier to see what is going on in the scene. The enhancement of the one or more edges may take place after the linear transformation of the colour image 200. The one or more edges detected above in action 803 and later enhanced may then be merged with the monochrome image 600.

Action 806

In order to make it even more difficult to find out too much from the information that is actually left in the transformed image it is possible to pseudo-colour pixels of the monochrome image 600 using a colour scheme.

An example of pseudo-colouring the pixels of the monochrome image 600 using the colour scheme is to generate a pseudo-coloured colour vector for a respective pixel 601, 602 of the monochrome image 600 by mapping a range of intensities of the one-dimensional colour component G to the pseudo-coloured colour vector. For example, a first range of intensities 0-10 may be mapped to a first pseudo-coloured colour vector 10, 10, 10, while a second range of intensities 10-20 may be mapped to a second pseudo-coloured colour vector 10, 20, 10 and so on.

Figure 9:
FIG. 9 illustrates a pseudo-coloured image resulting from embodiments herein.

FIG. 9 illustrates an image after application of the linear random function and after pseudo-colouring. It is possible to observe several persons in the image. However, identification of the persons is difficult.

This pseudo-colouring of the image would be possible to perform at the client side, for example at monitor 170 in FIG. 1. For example, the camera 120 may send out a one-channel image, such as image 600, to for example the server 150. The image 600 may then be mapped to pseudo-colours locally when it is to be shown, e.g. at monitor 170. Therefore, it is possible to save bandwidth over a network by only saving a one-channel intensity image, such as the monochrome image 600.

Figure 10:
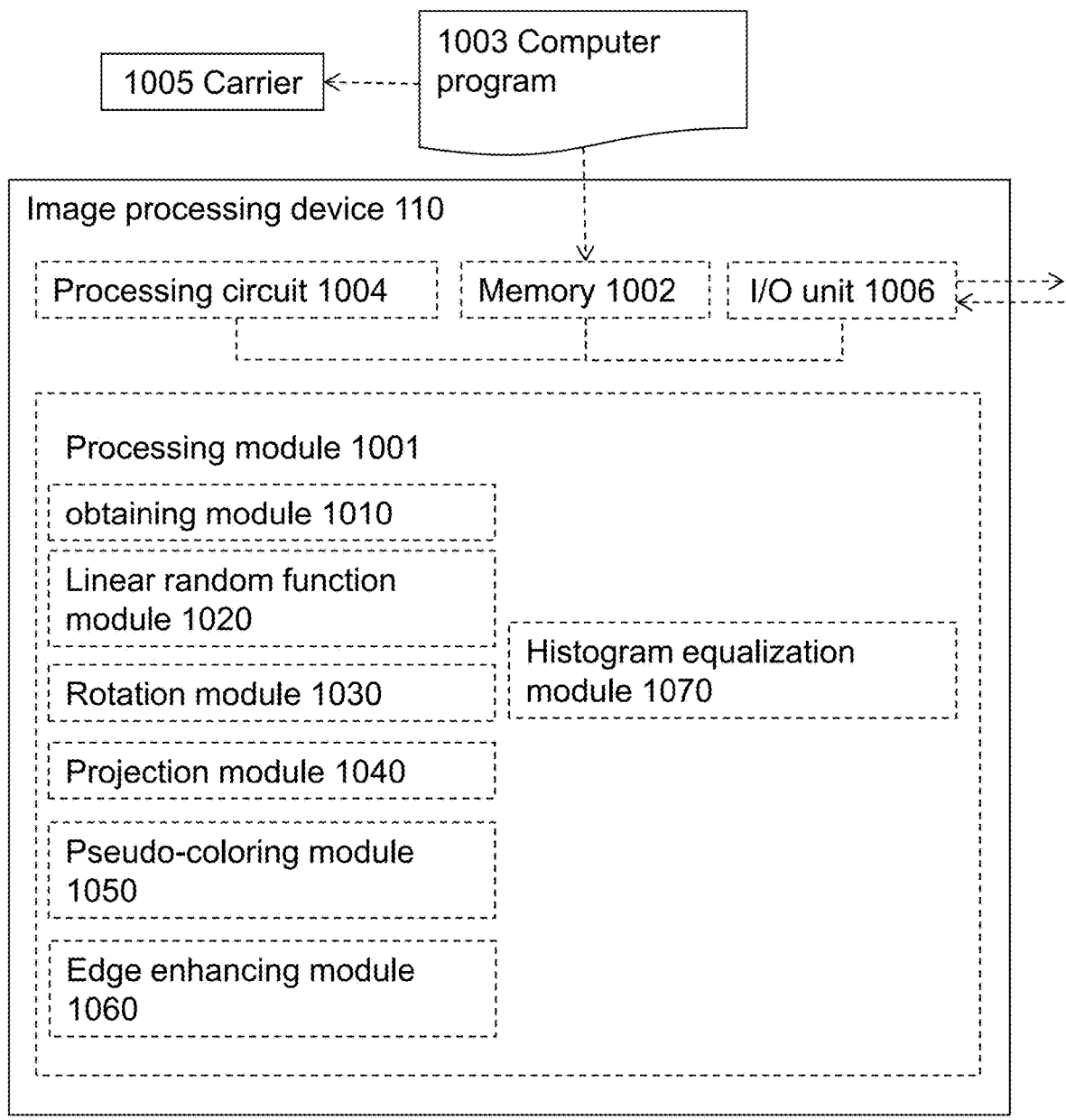
FIG. 10 is a block diagram illustrating embodiments of the image processing device.

With reference to FIG. 10, a schematic block diagram of embodiments of an image processing device 110 corresponding to the different image processing devices of FIG. 1 is shown. The image processing device 110 is configured to anonymize the digital colour image 200.

The image processing device 110 may comprise a processing module 1001, such as a means for performing the methods described herein. The means may be embodied in the form of one or more hardware modules and/or one or more software modules The image processing device 110 may further comprise a memory 1002. The memory may comprise, such as contain or store, instructions, e.g. in the form of a computer program 1003, which may comprise computer readable code units which when executed on the image-processing device 110 causes the image-processing device 110 to perform the method of anonymizing the digital colour image.

According to some embodiments herein, the image processing device 110 and/or the processing module 1001 comprises a processing circuit 1004 as an exemplifying hardware module, which may comprise one or more processors. Accordingly, the processing module 1001 may be embodied in the form of, or 'realized by', the processing circuit 1004. The instructions may be executable by the processing circuit 1004, whereby the image processing device 110 is operative to perform the methods of FIGS. 4 and 8. As another example, the instructions, when executed by the image processing device 110 and/or the processing circuit 1004, may cause the image processing device 110 to perform the method according to FIGS. 4 and 8.

In view of the above, in one example, there is provided an image processing device 110 for anonymizing the digital colour image. Again, the memory 1002 contains the instructions executable by said processing circuit 1004 whereby the image processing device 110 is operative for performing the method according to FIGS. 4 and 8:

obtaining the digital colour image, and applying the linear random function f to the respective colour vector v201, v501 representing colour components R, G, B of the respective pixel 201, 202 of the digital colour image 200 to obtain the monochrome image 600, wherein the linear random function varies over the pixels 201, 202 of the digital colour image 200, and wherein the linear random function f is dependent on at least one random parameter.

The image processing device 110 may further be operative to perform the methods according to the detailed embodiments described above in connection to FIGS. 4 and 8.

FIG. 10 further illustrates a carrier 1005, or program carrier, which comprises the computer program 1003 as described directly above. The carrier 1005 may be one of an electronic signal, an optical signal, a radio signal and a computer readable medium.

In some embodiments, the image processing device 110 and/or the processing module 1001 may comprise one or more of an obtaining module 1010, a linear random function module 1020, a rotation module 1030, a projection module 1040, a pseudo-colouring module 1050, an edge enhancing module 1060, a histogram equalization module 1070, as exemplifying hardware modules. In other examples, one or more of the aforementioned exemplifying hardware modules may be implemented as one or more software modules.

Moreover, the processing module 1001 comprises an Input/Output unit 1006. According to an embodiment, the Input/Output unit 1006 may comprise an image sensor configured for capturing the image 200.

Accordingly, the image processing device 110 is configured for anonymizing the digital colour image.

Therefore, according to the various embodiments described above, the image processing device 110 and/or the processing module 1001 and/or the obtaining module 1010 is configured for obtaining the digital colour image 200.

The image processing device 110 and/or the processing module 1001 and/or the linear random function module 1020 is configured for applying the linear random function f to the respective colour vector v201, v501 representing colour components R, G, B of the respective pixel 201, 202 of the digital colour image 200 to obtain the monochrome image 600.

The linear random function f varies over the pixels 201, 202 of the digital colour image 200. Further, the linear random function f is dependent on at least one random parameter.

The image processing device 110 and/or the processing module 1001 and/or the rotation module 1030 may be configured for rotating the colour vector v201, v501 with the one or more rotation functions, dependent on at least one random parameter, thereby obtaining the rotated colour vector v502.

The image processing device 110 and/or the processing module 1001 and/or the projection module 1040 may be configured for projecting the rotated colour vector v502 onto the one-dimensional colour component G.

In some embodiments projecting the rotated colour vector v502 onto the one-dimensional colour component G comprises selecting the rotated colour component G of the rotated colour vector v502, and discarding the other colour components R, B of the rotated colour vector.

In some other embodiments when the linear random function f comprises one or more projection weight functions which respectively varies over the pixels 201, 202 of the digital colour image 200 and is dependent on at least one random parameter, then the image processing device 110 and/or the processing module 1001 and/or the projection module 1040 may be configured for applying the linear random function f by:

projecting the colour vector v501 with the one or more random projection weight functions onto the one-dimensional colour component G.

The image processing device 110 and/or the processing module 1001 and/or the pseudo-colouring module 1050 may be configured for pseudo-colouring pixels 601, 602 of the monochrome image 600 using the colour scheme.

The image processing device 110 and/or the processing module 1001 and/or the enhancing module 1060 may be configured for enhancing the one or more edges present in the digital colour image 200.

The image processing device 110 and/or the processing module 1001 and/or the histogram equalization module 1070 may be configured for performing 802 the histogram equalization of the digital colour image 200 and/or of the monochrome image 600.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a obtaining means, linear function or transform means, rotation means, projecting means, pseudo-colouring means, edge enhancing means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method performed by an image-processing device, the method comprising:
    obtaining a digital colour image having pixels, and
    applying a linear random function (f) to a respective colour vector representing colour components of a respective pixel of the digital colour image to obtain an anonym ized monochrome colour image,
    wherein the linear random function (f) varies over the pixels of the digital colour image,
    wherein the linear random function (f) further is dependent on at least one random parameter,
    wherein the linear random function (f) is a polynomial of a pixel location within the digital colour image, and
    wherein applying the linear random function (f) comprises one of:
        projecting the colour vector with a linear random projection function (f1) onto a one-dimensional colour component, or
        rotating the colour vector with a linear random rotation function (f2), thereby obtaining a rotated colour vector, and projecting the rotated colour vector with a projection function onto the one-dimensional colour component.

2. The method according to claim 1, wherein the linear random function (f) varies smoothly over the pixels of the digital colour image.

3. The method according to claim 1, wherein the linear random rotation function comprises (f2) multiple rotation functions which respectively varies over the pixels of the digital colour image and is dependent, on the at least one random parameter.

4. The method according to claim 1, wherein projecting the rotated colour vector onto the one-dimensional colour component comprises:
    selecting a rotated colour component of the rotated colour vector to obtain the one-dimensional colour component, and
    discarding other colour components of the rotated colour vector.

5. The method according to claim 1, wherein the linear random projection function (f1) comprises a random projection weight function which respectively varies over the pixels of the digital colour image and which is dependent on the at least one random parameter.

6. The method according to claim 1, wherein the linear random function (f) varies smoothly over pixels which are within a predetermined distance from than a width of a person in the digital colour image.

7. The method according to claim 1, further comprising:
pseudo-colouring pixels of the monochrome colour image using a colour scheme.

8. The method according to claim 1, further comprising:
enhancing one or more edges present in the digital colour image.

9. The method according to claim 1, further comprising:
performing a histogram equalization of at least one of the digital colour image or of the monochrome colour image.

10. The method according to claim 7, wherein pseudo-colouring the pixels of the monochrome colour image using the colour scheme comprises:
generating a pseudo-coloured colour vector for a respective pixel of the monochrome colour image by mapping a range of intensities of the one-dimensional colour component to the pseudo-coloured colour vector.

11. The method according to claim 1, wherein the linear random projection function (f1) comprises:

$$f(x,y)=c_0+c_1x+c_2y+c_3x^2+c_4y^2+c_5xy+c_6x^3+c_7y^3+c_8xy^2+c_9x^2y$$

where $c_0$, $c_1$, $c_2$, $c_3$, $c_4$, $c_5$, $c_6$, $c_7$, $c_8$ and $c_9$ are random variables uniformly distributed between −0.5 and 0.5, and x,y represents the pixel location within the digital colour image.

12. The method according to claim 1, wherein the linear random rotation function (f2) comprises rotating pixels according to a rotation angle that is colour specific, as follows:

$$\text{rotation angle}=c_0+c_1x+c_2y+c_3x^2+c_4y^2+c_5xy+c_6x^3+c_7y^3+c_8xy^2+c_9x^2y$$

where $c_0$, $c_1$, $c_2$, $c_3$, $c_4$, $c_5$, $c_6$, $c_7$, $c_8$ and $c_9$ are random variables uniformly distributed between −0.5 and 0.5, and x,y represents the pixel location within the digital colour image.

13. The method according to claim 1, wherein the colour components of a respective pixel and the one-dimensional colour component are one of:
Red-Green-Blue (RGB) colour components and a one-dimensional RGB colour component, respectively;
Cyan, Magenta, Yellow, and Key (CMYK) colour components and a one dimensional CMYK colour component, respectively;
Hue Saturation Luminance (HSL) colour components and a one dimensional HSL colour component, respectively; or
Luminance and Chrominance (YUV) colour components and a one dimensional YUV colour component, respectively.

14. An image-processing device comprising a processing circuit configured to
obtain a digital colour image, and
apply a linear random function (f) to a respective colour vector representing colour components of a respective pixel of the digital colour image to obtain an anonymized monochrome colour image,
wherein the linear random function (f) varies over the pixels of the digital colour image,
wherein the linear random function (f) further is dependent on at least one random parameter,
wherein the linear random function (f) is a polynomial of a pixel location within the digital colour image, and
wherein applying a linear random function (f) comprises one of:
projecting the colour vector with the linear random projection function (f1) onto a one-dimensional colour component, or
rotating the colour vector with a linear random rotation function (f2), thereby obtaining a rotated colour vector, and projecting the rotated colour vector with a projection function onto the one-dimensional colour component.

15. The image processing device according to claim 14, wherein the linear random projection function (f1) comprises:

$$f(x,y)=c_0+c_1x+c_2y+c_3x^2+c_4y^2+c_5xy+c_6x^3+c_7y^3+c_8xy^2+c_9x^2y$$

where $c_0$, $c_1$, $c_2$, $c_3$, $c_4$, $c_5$, $c_6$, $c_7$, $c_8$ and $c_9$ are random variables uniformly distributed between −0.5 and 0.5, and x,y represents the pixel location within the digital colour image.

16. The image processing device according to claim 14, wherein the linear random rotation function (f2) comprises rotating pixels according to a rotation angle that is colour specific, as follows:

$$\text{rotation angle}=c_0+c_1x+c_2y+c_3x^2+c_4y^2+c_5xy+c_6x^3+c_7y^3+c_8xy^2+c_9x^2y$$

where $c_0$, $c_1$, $c_2$, $c_3$, $c_4$, $c_5$, $c_6$, $c_7$, $c_8$ and $c_9$ are random variables uniformly distributed between −0.5 and 0.5, and x,y represents the pixel location within the digital colour image.

17. The image processing device according to claim 14, wherein the colour components of a respective pixel and the one-dimensional colour component are one of:
Red-Green-Blue (RGB) colour components and a one-dimensional RGB colour component, respectively;
Cyan, Magenta, Yellow, and Key (CMYK) colour components and a one dimensional CMYK colour component, respectively;
Hue Saturation Luminance (HSL) colour components and a one dimensional HSL colour component, respectively; or
Luminance and Chrominance (YUV) colour components and a one dimensional YUV colour component, respectively.

18. A non-transitory computer program storage device, comprising computer readable code stored therein that when executed on an image-processing device causes the image-processing device to perform a method comprising:
obtaining a digital colour image, and
applying a linear random function (f) to a respective colour vector representing colour components of a respective pixel of the digital colour image to obtain an anonymized monochrome colour image,
wherein the linear random function (f) varies over the pixels of the digital colour image,
wherein the linear random function (f) further is dependent on at least one random parameter,
wherein the linear random function (f) is a polynomial of a pixel location within the digital colour image, and
wherein applying the linear random function (f) comprises one of
projecting the colour vector with a linear random projection function (f1) onto a one-dimensional colour component, or
rotating the colour vector with a linear random rotation function (f2), thereby obtaining a rotated colour vector, and projecting the rotated colour vector with a projection function onto the one-dimensional colour component.

* * * * *